United States Patent [19]

Ringis

[11] 4,372,440

[45] Feb. 8, 1983

[54] END SHAFT MOUNT FOR CONVEYOR

[75] Inventor: Gerald A. Ringis, Des Moines, Wash.

[73] Assignee: The Boeing Company, Seattle, Wash.

[21] Appl. No.: 218,707

[22] Filed: Dec. 22, 1980

[51] Int. Cl.³ ............................................. B65G 23/44
[52] U.S. Cl. .................................. 198/728; 198/813;
198/816; 198/834; 474/113
[58] Field of Search ............... 198/716, 728, 729, 813,
198/814, 815, 816, 834; 474/113, 117

[56] References Cited

U.S. PATENT DOCUMENTS

| | | | |
|---|---|---|---|
| 843,824 | 2/1907 | Johnston | 198/816 |
| 1,571,009 | 1/1926 | Holzer | 198/816 |
| 1,620,168 | 3/1927 | Silver | 198/816 |
| 1,660,939 | 2/1928 | Snow | 198/816 |
| 1,785,141 | 12/1930 | Morton | 198/816 |
| 1,787,984 | 1/1931 | Hippenmeyer | 198/816 |
| 1,794,491 | 3/1931 | Robbins | 198/816 |
| 2,252,033 | 8/1941 | Redler | 198/716 |
| 2,265,672 | 12/1941 | Redler | 198/716 |
| 2,355,100 | 8/1944 | Nordquist | 198/729 |
| 2,391,700 | 12/1945 | Hapman | 198/716 |
| 2,578,871 | 12/1951 | Woldring | 198/814 |
| 2,910,169 | 10/1959 | Russell | 198/729 |
| 2,953,241 | 9/1960 | Lehman | 198/816 |
| 3,319,775 | 5/1967 | Andreasen et al. | 198/801 |
| 3,378,171 | 4/1968 | Eaton | 198/716 |
| 3,483,639 | 12/1969 | Eftefield et al. | 198/834 X |
| 3,515,260 | 6/1970 | Clyne | 198/801 |

FOREIGN PATENT DOCUMENTS 506570  5/1939  United Kingdom ............... 198/814

Primary Examiner—Jeffrey V. Nase
Attorney, Agent, or Firm—Delbert J. Barnard; Eugene O. Heberer; Joan H. Pauly

[57] ABSTRACT

The driven head shaft of a drag elevator type conveyor is mounted at the roller end of a shaft mounting frame which is in the nature of a first class lever. A mid-portion of the shaft mounting frame is mounted onto an upper end portion of the conveyor main frame for pivotal movement about an axis which is parallel to the axes of both the head shaft and the tail shaft. A turnbuckle is interconnected between the upper portion of the shaft mounting frame and an upper portion of the main frame. The shaft mounting frame end of the turnbuckle is connected to a mid-portion of a lever arm which is at its upper end pivotally attached to the shaft mounting frame. The lower end of such lever rests on a pair of laterally spaced apart compression springs. The turnbuckle provides a way of adjusting the tension in a pair of roller chains which are portions of an endless carrier which extends between and is mounted on the head shaft and the tail shaft. The head shaft mounting mechanism also serves to dampen shock impulses which would otherwise have to be carried by the head shaft support bearings, the drive sprockets on the head shaft and the links of the roller chain.

25 Claims, 7 Drawing Figures

END SHAFT MOUNT FOR CONVEYOR

TECHNICAL FIELD

This invention relates to mechanical conveyors, and in particular to an improved end shaft mount for an endless conveyor adapted for easy adjustment of the end shaft to take up slack in the endless carrier, for dampening shock impulses, and for maintaining end shaft alignment during any movement of the end shaft.

BACKGROUND ART

It is known to adjustably mount at least one of the end shafts of a mechanical conveyor of the endless carrier type. Examples of conveyors which include an adjustable end shaft mount, existing in the patent literature, are disclosed by U.S. Pat. No. 843,824 granted Feb. 12, 1907, to Edward A. Johnston; by U.S. Pat. No. 1,571,009 granted Jan. 26, 1926, to Hiram A. Holzer; by U.S. Pat. No. 1,620,168, granted Mar. 8, 1927 to James W. Silver; by U.S. Pat. No. 1,660,939, granted Feb. 28, 1928 to Karl F. Snow; by U.S. Pat. No. 1,785,141, granted Dec. 16, 1930, to Rolla A. Morten: by U.S. Pat. No. 1,787,984, granted Jan. 6, 1931, to Irving R. Hippenmeyer; by U.S. Pat. No. 1,794,491, granted Mar. 3, 1931, to Hugh P. Robbins; by U.S. Pat. No. 2,355,100, granted Aug. 8, 1944, to Ronald E. J. Nordquist; by U.S. Pat. No. 2,391,700, granted Dec. 25, 1945, to Henry W. Hapman; by U.S. Pat. No. 2,910,169, granted Oct. 27, 1959, to John D. Russell; by U.S. Pat. No. 2,953,241, granted Sept. 20, 1960, to Herbert A. Lehman; by U.S. Pat. No. 3,319,775, granted May 16, 1967, to Owen A. Meyer and Segurd J. Andreasen; and by U.S. Pat. No. 3,515,260, granted June 2, 1970, to Robert W. Clyne.

Most of the conveyors disclosed by these patents include a separate adjustment screw or the like at each end of the end shaft. Also, many of such conveyors are without a shock absorber means for absorbing shock loads which would otherwise have to be carried by the bearing at the end of the end shaft.

Of the above listed patents, Morten U.S. Pat. No. 1,785,141 and Nordquist U.S. Pat. No. 2,355,100 disclose mounting structure for an end shaft of a conveyor which is adapted to move both ends of the end shaft together, in an equal amount. Morten U.S. Pat. No. 1,785,141 discloses a way of performing such movement without disturbing the driving connections. Nordquist U.S. Pat. No. 2,355,100 discloses one form of mechanism for absorbing shock in a conveyor.

The present invention relates to the provision of an improved end shaft mount for a conveyor, characterized by a construction which allows both ends of the shaft to be moved together. The end shaft mount of this invention is particularly usable with an elevator type conveyor, and in particular a drag type elevator conveyor similar to what is shown by U.S. Pat. No. 3,378,171, granted Apr. 16, 1968, to Jay S. Eaton, for elevating heated asphalt.

Examples of other types of elevator type conveyors are shown by U.S. Pat. No. 2,252,033, granted Aug. 12, 1941, to Arnold Redler and U.S. Pat. No. 2,265,672 granted Dec. 9, 1941, to Arnold Redler.

OBJECTS OF THE INVENTION

A principal object of the present invention is to provide an improved end shaft mount for an endless conveyor of a type which in use is subjected to stresses in the endless carrier (e.g. endless side chains) induced by impacts along the conveyed material path between the tail shaft and the head shaft.

Another object of this invention is to provide an end shaft mount which maintains alignment between the two sides of the endless carrier during adjustments, to in that manner decrease the wear on support wheels (e.g. sprockets) and endless carrier members (e.g. chain links) resulting from misalignments.

Another object of the invention is to provide an improved impact absorbing mount adapted to reduce stresses in the driven shaft, its support wheels, and the endless carrier.

An embodiment of end shaft mount in accordance with the present invention incorporates low friction pivots, a spring system for dynamic damping, and a solid mechanical tie to maintain factory alignment of the two side portions of the endless carrier (e.g. two side chains) and their support wheels (e.g. sprocket wheels on the shaft) during any and all movement of the end shaft.

DISCLOSURE OF THE INVENTION

According to an aspect of the invention, the end shaft is adjustably mounted by means including an end shaft mounting frame in the nature of a first class lever. A fulcrum means is provided for mounting the end shaft mounting frame onto the main frame of the conveyor, for pivotal movement about a transverse pivot axis which is parallel to the axis of the end shaft. The end shaft mounting frame includes a first lever portion which projects from the pivot axis towards the shaft. It carries journal mounts for the opposite ends of the shaft. A second lever portion projects in the opposite direction from the pivot axis. An adjustable arm means extends between the second lever portion of the end shaft mounting frame and a portion of the main frame which is spaced axially inwardly along said main frame from the pivot axis. Adjustment of the adjustable arm means causes a swinging movement of the shaft mounting frame about the pivot axis. A shortening of the adjustable arm means will result in the shaft mounting frame being swung in a direction removing slack from an endless carrier which travels about support wheels carried by the end shaft. The shaft mounting frame is a rigid structure and it interconnects the two ends of the end shaft and causes them to always move together so that factory alignment of the two sides of the endless carrier is maintained during adjustment and other movements.

In accordance with another aspect of the invention, the adjustable arm means is connected to a shock absorbing mechanism, the operation of which also always results in both ends of the end shaft moving together.

In accordance with another aspect of the invention, the end shaft that is carried by the shaft mounting frame is the drive shaft for the conveyor and the drive mechanism is mounted on such frame in such a way that it is not effected by either an adjustment of the adjustable arm means or an operation of the shock absorber means.

These and other features of the invention are described below in reference to the drawing.

BEST MODE FOR CARRYING OUT THE INVENTION

Figure 1:
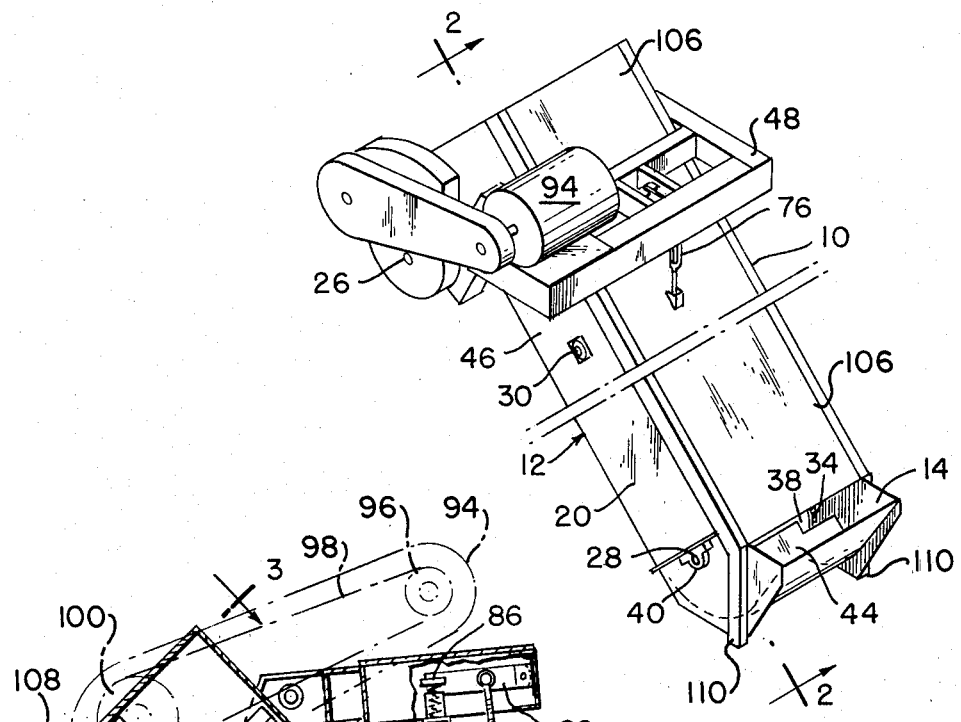
FIG. 1 is an isometric view of a drag elevator incorporating an embodiment of the present invention, broken away at its middle to indicate indeterminate length.

FIG. 1 shows a drag elevator incorporating an embodiment of the present invention. Such conveyor was specifically designed for receiving hot asphalt at ground level (e.g. from a drum-mix asphalt plant) and elevating it up to, and discharging it into, a truck loading silo. However, it is understood that the end mount structure of the present invention may be used with any type of conveyor of similar construction which encounters similar end shaft loading problems.

Conveyor 10 is constructed to include an elongated main frame 12 having a material (e.g. asphalt) receiving hopper 14 at its lower end and a material discharge chute 16 at its opposite end.

Frame 12 comprises a bottom wall 18 and a pair of side walls 20, 22. Walls 18, 20, 22 form a channel or trough of U-shaped cross section which extends for the full length of the conveyor 10. The details of construction of this frame are not a part of the present invention so they will not be described in any detail.

Figure 2:
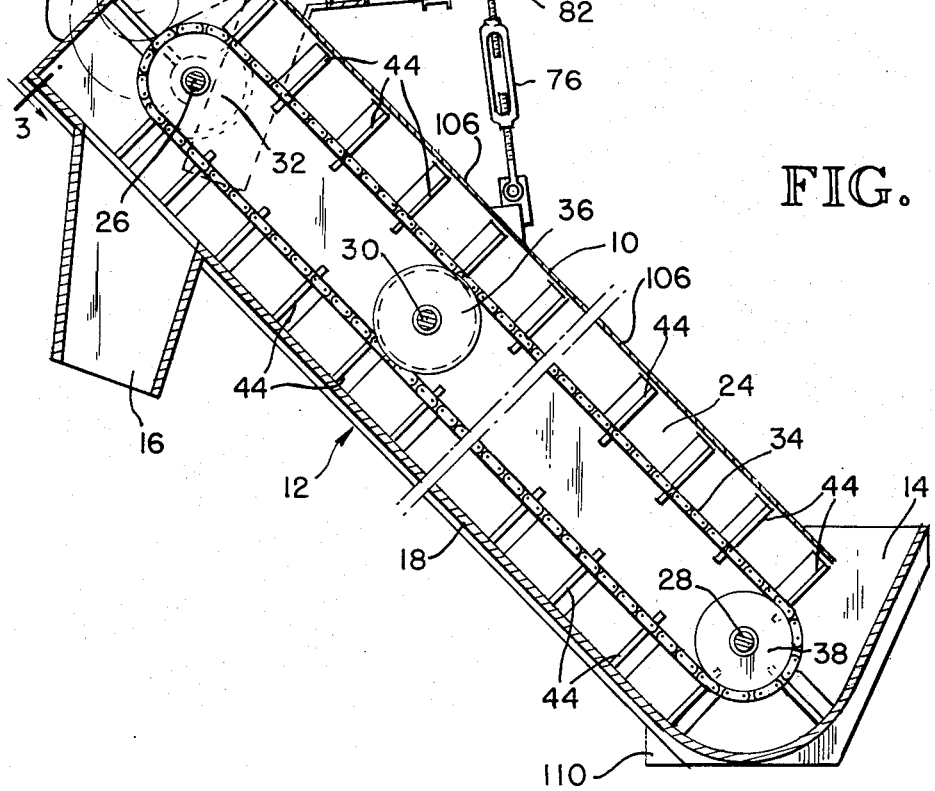
FIG. 2 is a longitudinal sectional view of the drag elevator shown by FIG. 1, including a phantom line showing of portions of the drive mechanism.

The main frame 12 houses an endless carrier 24 which is supported by and runs on support wheels carried by a plurality of cross shafts, including a head shaft 26, a tail shaft 28 and a plurality of idler shafts 30. As previously described, FIGS. 1 and 2 are cutaway views showing only the two ends of the conveyor 10. FIG. 2 illustrates only a single idler shaft 30. It is to be understood that an actual installation would have a relatively large number of idler shaft assemblies spaced apart in the region between idler shaft 30 and tail shaft 28. For example, a typical installation involving a head shaft-to-tail shaft length of between fifty and sixty feet would probably include somewhere between seven and ten idler assemblies between the end shaft 26 and tail shaft 28.

In the illustrated embodiment the head shaft 26 is driven and it carries a pair of spaced apart sprockets 32, having teeth which engage the links of a pair of endless roller chains 34. The idler shafts 30 and the tail shaft 28 carry flanged free rolling wheels 36, 38. The roller chains extend over and ride on smooth peripheral surface portions of the idler wheels 36, 38 and are retained on such surfaces by side flanges. This manner of chain drive results in smooth running and also reduces chain wear.

As is conventional practice, and as shown by FIG. 1, the ends of the tail shaft 28 and the idler shafts 30 project out through openings in the side walls 20, 22 and are received in bushings 40, which are mounted on outer portions of the side walls 20, 22.

Since the illustrated embodiment is a drag conveyor, the roller chains 34 carry a large number of closely spaced apart drag flights 44. These flights 44 are secured to the chains in any suitable manner.

Referring to FIG. 2, in operation, the head shaft 26 and the sprockets 32 driven thereby are rotated in the clockwise direction, causing the lower run of the endless carrier 34 to move upwardly and the upper run to move downwardly. The flights 44 moving through the hopper 14 collect some of the material (e.g. asphalt) which has been deposited into the hopper 14 ahead of them and push such material up the bottom wall 18 of the main frame 12 as they move upwardly. When such material reaches the inlet of the discharge chute 16 it falls by gravity into the chute 16 and the chute 16 directs it into a silo or other chosen receptacle.

In conventional drag elevators chain and sprocket wear is accelerated by shock impulses acting between traction wheels carried by the tail shaft 28 and the drive sprockets carried by the head shaft 26. In accordance with the present invention, the head shaft 26 in conveyor 10 is mounted in such a way that these shock impulses are dampened.

As best shown by FIGS. 1–3 and 7, the head shaft 26 is not mounted directly on the main frame 12 but rather is mounted onto an end shaft mounting frame 46 which is in turn pivotally mounted onto the main frame 12. In preferred form, the end shaft mounting frame 46 mounts the head shaft 26, so such frame is hereinafter referred to as the head shaft frame.

Frame 46 is in the nature of a first class lever. It is pivotally mounted by a fulcrum means 47 to an upper end portion of the main frame 12. It comprises an upper lever portion 48 and a lower lever portion 50, 52. Lever portions 48 and 50, 52 extend at an angle with respect to each other (about 120° in the illustrated embodiment), giving the frame 46 a dihedral form. The pivotal connection established by the fulcrum means 47 is generally at the apex of the frame and the two lever portions 48 and 50, 52 diverge apart as they extend axially inwardly of the main frame 12.

In plan, the shaft mounting frame 46 has a U-shaped figuration. It comprises a pair of side members, the lower parts of which are arms which form the lower lever portion 50, 52 and the upper parts of which, and a cross frame structure, together form the upper lever portion 48.

The side walls 20, 22 of the main frame 12 include openings 59 (FIG. 7), through which the end portions 54, 56 of the head shaft 26 extend. Such end portions 54, 56 are received in journal blocks 58, 60 which are carried by the two arms 50, 52.

Figure 7:
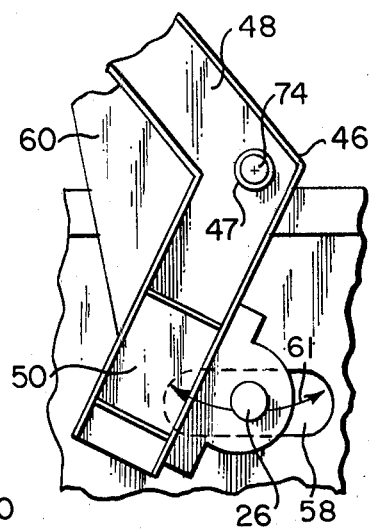
FIG. 7 is a fragmentary side elevational view of the shaft carrying end of the head shaft frame, and showing side holes in the side walls of the main frame sized to permit movement of the head shaft.

The side wall openings, one of which is designated 59 in FIG. 7 are elongated in a direction generally coinciding with the arcuate swing path 61 of head shaft 26.

Figure 4:
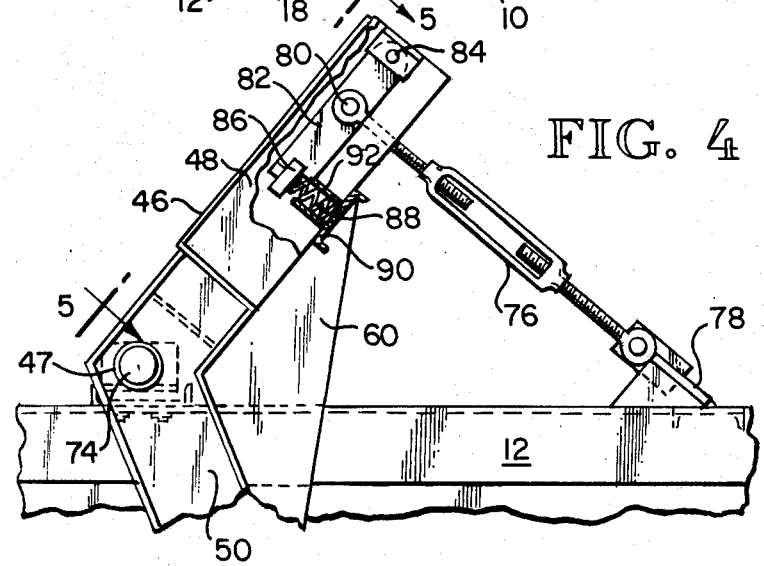
FIG. 4 is a fragmentary view on an enlarged scale, showing the upper portion of the head shaft frame and an adjustable brace arm in side elevation, with a portion of the head shaft frame being broken away for the purpose of better illustrating shock absorbing mechanism at the head frame end of the adjustable brace arm.

As shown by FIGS. 4 and 7, a gusset plate 60 may be provided on each side of the conveyor 10, to extend between the upper and lower lever portions, as illustrated, to brace the upper and lower lever portions 48, 50 of frame 46 against folding inwardly toward each other when loaded.

The side parts of the head shaft frame 46 may be constructed from I-beam stock, as illustrated. The upper portion 48 of frame 46 may comprise a pair of spaced apart cross members 62, 64 which may be channel members of about the same depth as the I-beam members. Upper portion 48 may be reinforced by a pair of perpendicular channel members 66, 68 and a pair of diagonal angle iron members 70, 72 as illustrated. The upper portion 48 is of what may be termed a truss construction so that it can serve as a quite rigid base structure from which the two side arms 50, 52 depend in cantilever fashion. In other words, the rather elaborate bracing of the upper portion 48 is done to insure that the two side arms 50, 52 which extend downwardly adjacent the main frame, to support the end portions of head shaft 26, are adequately stiff. The frame 46 is provided to link together the opposite ends of the head shaft 26 so that proper shaft alignment is maintained during any type of pivotal movement of the frame 46. The two support arms 50, 52 must be stiff enough to prevent misalignment due to their bending, twisting, etc.

The fulcrum means 47 which mounts the frame 46 onto the main frame 12, for pivotal movement about the pivot axis 74, may be of any suitable construction and for this reason no particular construction is shown in detail.

As shown by FIG. 7, the design attitude of shaft mounting frame 46 is such that the pivot axis 74 and the axis of rotation of head shaft 26 both lay on an imaginary line which is substantially perpendicular to the longitudinal center line of the endless conveyor mechanism. An adjustable arm, shown to include a mechanical turnbuckle 76, is interconnected between upper frame portion 48 and an abutment 78 on top of the main frame 12 at a location spaced longitudinally inwardly of the main frame 12 from the pivot axis 74. The designed attitude of turnbuckle 76 causes it to extend substantially perpendicular to upper lever portion 48.

Figure 3:
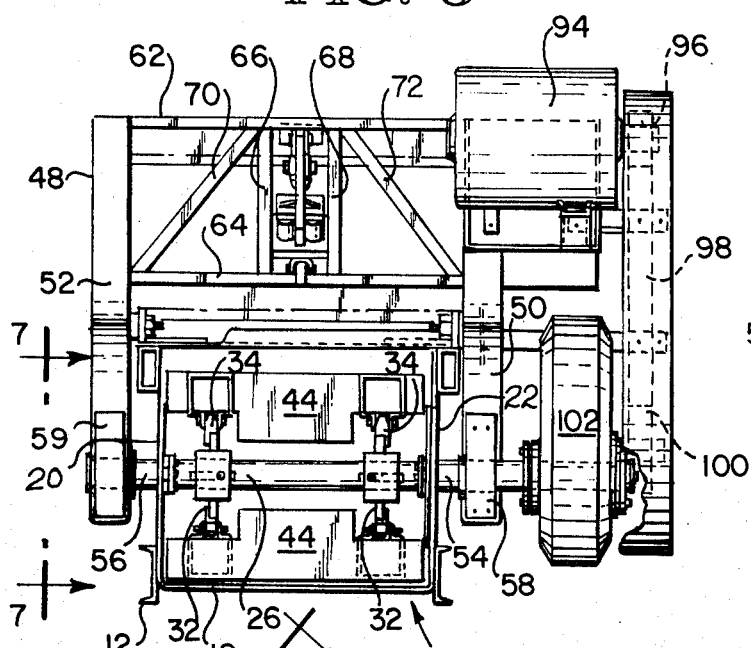
FIG. 3 is an end view looking toward the head end of the drag elevator, with the end wall removed, such view being taken substantially from the aspect of line 3—3 in FIG. 2.
Figure 5:
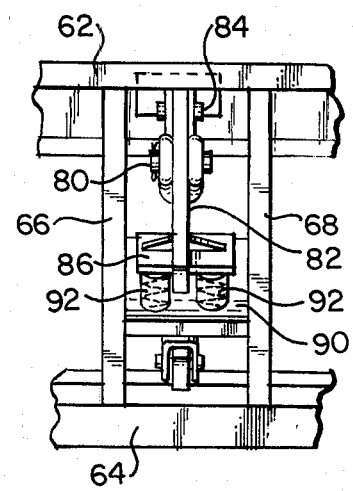
FIG. 5 is a plan view taken substantially from the aspect of line 5—5 in FIG. 4.
Figure 6:
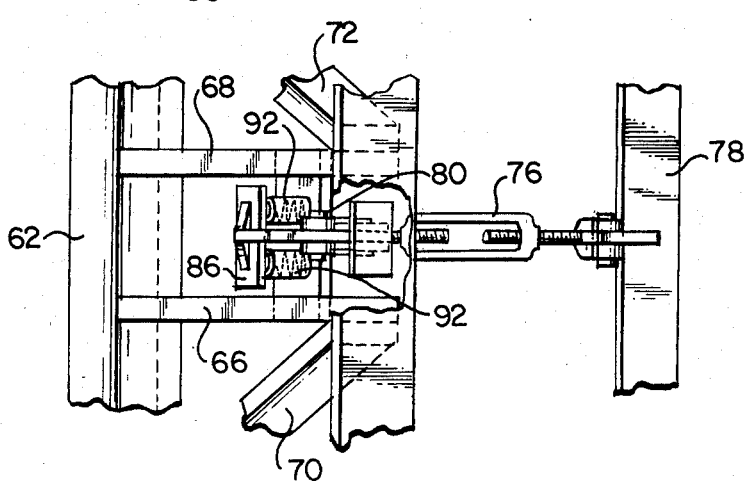
FIG. 6 is a top view of the mechanism shown by FIG. 4.

The end of turnbuckle 76 opposite abutment 78 is connected at 80 to the mid-portion of a lever 82. The upper or outboard end of lever 82 is pin connected at 84, between a pair of mounting ears, to provide a pivotal connection at such end. The opposite end of lever 82 may carry a cross member 86 having a pair of opposite side portions which each extend perpendicularly outwardly from a side face of lever 82. These side portions rest on first ends of a pair of spaced apart coil springs 88. The opposite ends of springs 88 rest on a cross member 90 which is interconnected between the two frame members 66, 68 (FIGS. 3, 5 and 6).

As best shown by FIG. 4, a tightening movement of turnbuckle 76 exerts a force on lever 82 which is resisted by stored energy of the compression springs 88 to a sufficient extent that such tightening or shortening of the turnbuckle 76 will cause a clockwise rotation of frame 46. Such rotation moves the head shaft 26 endwise outwardly along its swing path 61. Thus, the turnbuckle 76 is shortened for the purpose of removing slack from, and establishing a desired operating tension in, the two side chains 34.

Shortening of turnbuckle 76 to tension the conveyor chains 34 also stores some energy in the compression springs 88. However, sufficient compression ability remains in the springs 88 so that the springs 88 can absorb shock loads. These shock loads generally occur as a result of braking forces acting on the chains 34 while the drive mechanism is still wanting to rotate head shaft 26 and the sprocket wheels 32. These braking forces occur when some of the material being lifted becomes pinched between an end portion of a flight 44 and the bottom wall 18. The just described shock absorber system dampens the shock impulses and protects the support bearings for the end shaft against these forces, prolonging their useful lives. The face that the rigid construction of frame 46 maintains a fixed alignment between the head shaft 26 and tail shaft 28, reduces chain wear by eliminating binding between the chain side links and the drive sprockets.

The lower portions of the springs 88 may be housed in tubular retainers 92 which are secured to the cross member 90.

The drive motor 94 for driving the head shaft 26 is mounted onto lever portion 48 of head frame 46. Motor 94 includes an output shaft carrying a first pulley 96. A drive belt 98 extends between first pulley 96 and a second pulley 100 connected to the input shaft of a gear reducer 102. The output gear reducer 102 is an end portion of the head shaft 26. According to this arrangement, the entire drive system moves together in a fixed relationship when the supporting frame 46 moves.

As shown FIG. 3, the end portion 54 of head shaft 26 extends through bushing 58 and beyond, and outwardly of bushing 58 it is secured to the output of the gear reducer 102.

The wheels on the driven head shaft 26 are sprocket wheels and in the preferred embodiments they are the only sprocket wheels in the system. The idle wheels have smooth peripheral portions between the upstanding flanges which are slightly wider than the chains. Thus, the chains set down into a peripheral groove region between the side flanges and the side flanges keep the chains from sliding sideways off from the idle wheels.

Shock pulses acting on the chain merely cause the chain to slip on the tail shaft wheels and on the idle wheels. However, because the sprockets have teeth which fit into the chain spaces between rollers, and since the head shaft is driven, the shock impulses would stress the sprocket teeth, the chain links, and the bearing supporting the head shaft unless some means was provided for dampening the shock forces.

In summary, the conveyor mechanism 10 features a unique shock-absorbing drive system which is designed to provide increased chain and sprocket life and easy maintainence. Shock impulses between the traction wheels carried by the tail shaft and the drive sprockets carried by the head shaft are dampened and absorbed by the compression spring. The rigid nature of the frame 46 reduces chain wear by maintaining a fixed drive-sprocket shaft alignment to eliminate binding between the chain side links and the drive sprockets. For easy maintainence, the drive system is mounted to allow the drive chains to be adjusted by a single turnbuckle. The drive motor and gear box are mounted on a pivoting base. When the head sprocket shaft is adjusted (by turning the turnbuckle) the relationship between the motor and gear box remains fixed; additional drive belt adjustment is not required. All adjustment and maintainence points are easily accessible.

As shown by FIGS. 1, 2, the conveyor 10 may be provided with sheet metal cover sections or doors 106. Doors 106 may be hinge connected to upper portions of the main frame 12. Also, an end cover or door 108 may be provided at the upper end of the frame 12.

A drag elevator of the type described would be constructed to include an expanded metal walkway extending along the conveyor, from the hopper up to the discharge chute, on the drive motor side of the conveyor. Some installations might be made portable in which case they would include a wheel assembly situated below bottom wall 18, at a location spaced upwardly from the tail shaft 28, and a support foot would be provided near the opposite end of the conveyor, so that the conveyor could be established in a horizontal position on the wheel assembly and such support foot. Additional support foot means 110 are provided adjacent the hopper, to make ground engagement when the conveyor 10 is in its operative position.

Although only one embodiment of the present invention has been disclosed and described in detail, it will be appreciated that other specific arrangements could be provided by a person skilled in the art which would serve equally well for the purpose intended, and would fall within the scope of the invention as defined in the following claims.

What is claimed is:

1. In a mechanical conveyor of a type having a main frame; a transverse shaft at one end of said main frame, carrying a pair of axially spaced apart chain supporting wheels; and material moving means including a pair of laterally spaced apart endless chains, one on each side of the conveyor, extending about the chain supporting wheel on its side of the conveyor, an improved mount for said shaft, comprising:

a shaft mounting frame in the nature of a first class lever, fulcrum means mounting said shaft mounting frame onto said main frame, for pivotal movement about a transverse pivot axis which is parallel to said shaft, said shaft mounting frame including a first lever portion projecting from said pivot axis toward the shaft and carrying journal mounts for the opposite ends of the shaft, and a second lever portion projecting in the opposite direction from said pivot axis; and adjustable arm means extending between the second lever portion of the shaft mounting frame and a portion of the main frame spaced axially inwardly of said main frame from said pivot axis;

said main frame including sidewalls having aligned shaft end receiving openings therein, said shaft extending laterally across the main frame and includes end portions which project outwardly through said openings, and the first lever portion of the shaft mounting frame comprising an arm member on each side of the conveyor, each said arm member being located outwardly adjacent the main frame sidewall on its side of the conveyor, and the journal mounts for the opposite ends of the shaft being carried by said arm members.

2. Conveyor apparatus according to claim 1, wherein the second lever portion of the shaft mounting frame comprises a pair of spaced apart cross frame members and reinforcement frame members extending between the cross frame members, for making the second lever portion relatively stiff.

3. Conveyor apparatus according to claim 1, wherein the shaft mounting frame carries a shock absorber means and the shaft mounting frame end of the adjustable arm means is connected to said shock absorber means, whereby shock forces applied on the shaft mounting frame, tending to pivot it about said pivot axis, are absorbed by said shock absorber means.

4. Conveyor apparatus according to claim 1, wherein said shaft is a driven shaft and the wheels are sprockets having teeth which engage the conveyor chains, and wherein said conveyor comprises a drive motor carried by the second lever portion of the shaft mounting frame and drive transmission means interconnected between an output shaft of said drive motor and one end of the shaft.

5. Conveyor apparatus according to claim 1, wherein the first and second lever portions are angled, giving the shaft mounting frame a dihedral form.

6. Conveyor apparatus according to claim 5, further comprising triangular gussets on each side of the shaft mounting frame, extending between the first and second lever portions of the shaft mounting frame.

7. In a mechanical conveyor of a type having a main frame; a transverse shaft at one end of said main frame, carrying a pair of axially spaced apart chain supporting wheels; and material moving means including a pair of laterally spaced apart endless chains, one on each side of the conveyor, extending about the chain supporting wheel on its side of the conveyor an improved mount for said shaft, comprising:

a shaft mounting frame in the nature of a first class lever, fulcrum means mounting said shaft mounting frame onto said main frame, for pivotal movement about a transverse pivot axis which is parallel to said shaft, said shaft mounting frame including a first lever portion projecting from said pivot axis toward the shaft and carrying journal mounts for the opposite ends of the shaft, and a second lever portion projecting in the opposite direction from said pivot axis; and adjustable arm means extending between the second lever portion of the shaft mounting frame and a portion of the main frame spaced axially inwardly of said main frame from said pivot axis; said shaft mounting frame carrying a shock absorber means, and said shaft mounting frame end of the adjustable arm means being connected to said shock absorber means, whereby shock forces applied on the shaft mounting frame, tending to pivot it about said pivot axis, are absorbed by said shock absorber means;

said shock absorber means comprising an elongated beam member which extends substantially perpendicular to the adjustable arm means and which is pivotally attached at one of its ends to the second lever portion of the shaft mounting frame;

compression spring means carried by said second lever portion of the shaft mounting frame and positioned to contact the opposite end of said beam, on the adjustable arm means side of said beam; and connector means connecting the shaft mounting frame end of the adjustable arm means to a midportion of said beam.

8. Conveyor apparatus according to claim 7, wherein the adjustable arm means includes a mechanical turnbuckle.

9. Conveyor apparatus according to claim 7, wherein said beam includes a transverse cross member at its opposite end, and said spring means comprises a pair of compression springs positioned side-by-side and both contacting said transverse cross member.

10. In a mechanical conveyor of a type having a main frame; a tail shaft at one end of said main frame, carrying a pair of axially spaced apart tail wheels; a head shaft at the opposite end of the main frame, carrying a pair of axially spaced apart head wheels; and material moving means including a pair of laterally spaced apart endless chains, one on each side of the conveyor, extending about both the head wheel and the tail wheel on its side of the conveyor, an improved mount for the head shaft, comprising:

a head shaft frame in the nature of a first class lever, fulcrum means mounting said head shaft frame onto said main frame, for pivotal movement about a transverse pivot axis which is parallel to both the tail shaft and the head shaft, said head shaft frame including a first lever portion projecting from said pivot axis toward the head shaft and carrying journal mounts for the opposite ends of the head shaft, and a second lever portion projecting in the opposite direction from said pivot axis; and adjustable arm means extending between the second lever portion of the head shaft frame and a portion of the main frame spaced axially inwardly from said pivot axis;

said main frame including sidewalls having aligned head shaft receiving openings therein, said head shaft extending laterally across the main frame and including end portions which project outwardly through said openings, and said first lever portion of the head shaft frame comprising an arm member on each side of the conveyor, each said arm member being located outwardly adjacent the main frame sidewall on its side of the conveyor, and said journal mounts for the opposite ends of the head shaft being carried by said arm members.

11. Conveyor apparatus according to claim 10, wherein the second lever portion of the head shaft frame comprises a pair of spaced apart cross members, for making the second lever portion relatively stiff.

12. Conveyor apparatus according to claim 10, wherein the head shaft frame carries a shock absorber means and the head shaft frame end of the adjustable arm means is connected to said shock absorber means, whereby shock forces applied on the head shaft frame, tending to pivot it about said pivot axis, are absorbed by said shock absorber means.

13. Conveyor apparatus according to claim 10, wherein said head shaft is a driven shaft and the head wheels are sprockets having teeth which engage the conveyor chains, and wherein said conveyor comprises a drive motor carried by the second lever portion of the head shaft frame and drive transmission means interconnected between an output shaft of said drive motor and one end of the head shaft.

14. Conveyor apparatus according to claim 10, wherein the first and second lever portions of the head shaft frame both angle towards the tail shaft end of the conveyor, giving the head shaft frame a dihedral form.

15. Conveyor apparatus according to claim 14, further comprising triangular gusset means on each side of the head shaft frame, extending between the first and second lever portions of the head shaft frame.

16. In a mechanical conveyor of the type having a main frame; a tail shaft at one end of said main frame, carrying a pair of axially spaced apart tail wheels; a head shaft at the opposite end of the main frame, carrying a pair of axially spaced apart head wheels; and material moving means including a pair of laterally spaced apart endless chains, one on each side of the conveyor, extending about both the head wheel and the tail wheel on its side of the conveyor, an improved mount for the head shaft, comprising:

a head shaft frame in the nature of a first class lever, fulcrum means mounting said head shaft frame onto said main frame, for pivotal movement about the transverse pivot axis which is parallel to both the tail shaft and the head shaft, said head shaft frame including a first lever portion projecting from said pivot axis toward the head shaft and carrying journal mounts for the opposite ends of the head shaft, and a second lever portion projecting in the opposite direction from said pivot axis; and adjustable arm means extending between the second lever portion of the head shaft frame a portion of the main frame spaced axially inwardly from said pivot axis;

said head shaft frame carrying a shock absorber means, and said head shaft frame end of the adjustable arm means being connected to said shock absorber means, whereby shock forces applied on the head shaft frame, tending to pivot it about said pivot axis, are absorbed by said shock absorber means;

said shock absorber means comprising an elongated beam member which extends substantially perpendicular to the adjustable arm means and which is pivotally attached at one of its ends to the second lever portion of the head shaft frame;

compression spring means carried by said second lever portion of the head shaft frame and positioned to contact the opposite end of said beam, on the adjustable arm means side of the said beam; and connector means connecting the head shaft frame end of the adjustable arm means to a mid-portion of said beam.

17. Conveyor apparatus according to claim 16, wherein the adjustable arm means comprises a mechanical turnbuckle.

18. Conveyor apparatus according to claim 16, wherein said beam includes a transverse cross member at its second end, and said spring means comprises a pair of compression springs positioned side-by-side and both contacting said transverse member.

19. An endless conveyor comprising:
 an elongated main frame;
 a tail shaft journaled for rotation at one end of the main frame by means of fixed journals carried by the main frame at such end, said tail shaft carrying smooth periphery chain support wheels;
 a head shaft carrying toothed sprockets;
 a shock absorbing mount for the head shaft at the head end of the frame, comprising a subframe that is pivotally mounted onto the main frame at such end, for pivotal movement about a pivot axis which is parallel to the axis of rotation of both the head shaft and the tail shaft, said subframe including means mounting the opposite ends of the said head shaft in fixed relationship to each other at a location that is offset from the pivot axis and aligned along the main frame with the tail shaft;
 spring means acting on the subframe to bias the head shaft generally away from the tail shaft;
 and endless carrier means extending from one end of the conveyor to the other, about both the head shaft sprockets and the tail shaft smooth wheels, to define upper and lower runs, said endless conveyor means comprising a pair of side roller chains having links which engage the teeth of the sprockets and make only frictional engagement with the peripheral portions of the smooth wheels;
 and means for driving the head shaft, whereby the spring means acting on the subframe serves to dampen shock impulses imposed by the endless carrier on the chain links, the sprockets and the drive wheels;

said subframe being in the nature of a first class lever, said subframe including a first lever portion projecting from said pivot axis toward the shaft and carrying journal mounts for the opposite ends of the shaft, and a second lever portion projecting in the opposite direction from said pivot axis; and adjustable arm means extending between the second lever portion of the shaft mounting frame and a portion of the main frame spaced axially inwardly of said main frame from said pivot axis;

said main frame including sidewalls having aligned shaft end receiving openings therein, said head shaft extending laterally across the main frame and includes end portions which project outwardly through said openings, and said first lever portion of the subframe comprises an arm member on each side of the conveyor, each said arm member being located outwardly adjacent the main frame sidewall on its side of the conveyor, and said journal mounts for the opposite ends of the shaft being carried by said arm members.

20. Conveyor apparatus according to claim 19, wherein the second lever portion of the subframe comprises a pair of spaced apart cross frame members and reinforcement frame members extending between the cross frame members, for making the second lever portion relatively stiff.

21. Conveyor apparatus according to claim 19, wherein the subframe carries a shock absorber means which includes said spring means, and the subframe end of the adjustable arm means is connected to said shock absorber means, whereby shock forces applied on the shaft mounting frame, tending to pivot it about said pivot axis, are absorbed by said shock absorber means.

22. Conveyor apparatus according to claim 21, wherein said shock absorber means comprises an elongated beam member which extends substantially perpendicular to the adjustable arm means and which is pivotally attached at one of its ends to the second lever portion of the subframe;

and said spring means is a compression spring means carried by said second lever portion of the subframe and positioned to contact the opposite end of said beam, on the adjustable arm means side of said beam; and connector means connecting the shaft mounting frame end of the adjustable arm means to a midportion of said beam.

23. Conveyor apparatus according to claim 22, wherein the adjustable arm means includes a mechanical turnbuckle.

24. An endless conveyor, comprising:

an elongated main frame;

a tail shaft mounted for rotation at one end of the main frame, said tail shaft carrying support wheel means;

a head shaft carrying drive wheel means;

a shock absorbing mount for the head shaft, comprising a subframe in the nature of a first class lever, said subframe including means pivotally mounting it onto the main frame, at the end of the main frame opposite the tail shaft, for pivotal movement about a pivot axis which is parallel to the axis of rotation of both the head shaft and the tail shaft, a first lever portion projecting from said pivot axis towards the head shaft and carrying journal mounts for the head shaft, and a second lever portion projecting in the opposite direction from the pivot axis, an elongated beam member which is pivotally attached at one of its ends to the second lever portion of the subframe, adjustable length arm means interconnected between an intermediate portion of said elongated beam member and the main frame, said adjustable length arm means extending substantially perpendicular to the elongated beam member, and a compression spring means carried by the second lever portion of the subframe and positioned to contact the end of the elongated beam member opposite the pivotal connection, on the adjustable length arm means side of said elongated beam member; and an endless carrier means extending from one end of the conveyor to the other, about both the head shaft drive wheel means and the tail shaft support wheel means, to define upper and lower runs; and means for driving the head shaft, whereby the compression spring means acting on the subframe serves to dampen shock impulses imposed by the endless carrier means during operation of the conveyor.

25. An endless conveyor according to claim 24, wherein said adjustable arm means is a turnbuckle adjustable in length.

* * * * *